US009622205B2

United States Patent
Gong

(10) Patent No.: US 9,622,205 B2
(45) Date of Patent: Apr. 11, 2017

(54) TERMINAL REGISTRATION METHOD, DEVICE, AND SYSTEM

(71) Applicant: HUAWEI TECHNOLOGIES CO., LTD., Shenzhen, Guangdong (CN)

(72) Inventor: Lei Gong, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 25 days.

(21) Appl. No.: 14/561,735

(22) Filed: Dec. 5, 2014

(65) Prior Publication Data

US 2015/0087305 A1    Mar. 26, 2015

Related U.S. Application Data

(63) Continuation of application No. PCT/CN2013/070920, filed on Jan. 24, 2013.

(30) Foreign Application Priority Data

Jun. 6, 2012    (CN) .......................... 2012 1 0184757

(51) Int. Cl.
*H04W 4/00*        (2009.01)
*H04W 60/00*    (2009.01)
(Continued)

(52) U.S. Cl.
CPC ............. *H04W 60/00* (2013.01); *H04L 43/16* (2013.01); *H04W 60/005* (2013.01); *H04W 60/06* (2013.01)

(58) Field of Classification Search
CPC . H04W 24/04; H04W 40/24; H04W 56/0015; H04W 84/105; H04W 84/02;
(Continued)

(56) References Cited

U.S. PATENT DOCUMENTS 5,774,803 A * 6/1998 Kariya ................. H04W 88/02
455/414.2
7,835,751 B2 * 11/2010 Ibe ........................ H04W 36/14
370/338

(Continued)

FOREIGN PATENT DOCUMENTS

CN    1983993    6/2007
CN    1992606    7/2007
(Continued)

OTHER PUBLICATIONS

PCT International Search Report dated May 2, 2013 in corresponding International Patent Application No. PCT/CN2013/070920.
(Continued)

*Primary Examiner* — Jean Gelin
(74) *Attorney, Agent, or Firm* — Staas & Halsey LLP

(57) ABSTRACT

Embodiments of the present invention provide a terminal registration method, device, and system, and relate to the field of communications technologies, so as to ensure that a terminal determines in time whether registration is successful, and save network resources. The method includes: starting, by an access point device, monitoring on a monitored resource when the access point device receives an access request message sent by a terminal; and after the terminal sends a registration request message to a database, if the access point device receives, when the monitored resource monitored by the access point device does not reach a monitoring threshold, a registration response message sent by the database, stopping the monitoring on the monitored resource. Embodiments of the present invention are used for terminal registration.

13 Claims, 5 Drawing Sheets

(51) Int. Cl.
*H04L 12/26* (2006.01)
*H04W 60/06* (2009.01)

(58) Field of Classification Search
CPC ......... H04W 8/26; H04W 8/30; H04W 60/00; H04W 72/08; H04W 72/10; H04W 60/005; H04W 60/02; H04W 60/06
USPC .... 455/414.1, 435.1, 435.2, 435.3, 433, 434
See application file for complete search history.

(56) References Cited

U.S. PATENT DOCUMENTS

| | | | |
|---|---|---|---|
| 2004/0105416 A1* | 6/2004 | Rue | H04L 12/24 370/338 |
| 2006/0003769 A1* | 1/2006 | Liu | H04W 36/0083 455/436 |
| 2006/0068837 A1* | 3/2006 | Malone | H04W 72/1215 455/552.1 |
| 2008/0259850 A1 | 10/2008 | Dai | |
| 2008/0305835 A1* | 12/2008 | Johnstone | H04W 48/02 455/561 |
| 2010/0074236 A1* | 3/2010 | Takeda | H04W 24/04 370/338 |
| 2011/0125925 A1* | 5/2011 | Bouthemy | H04L 12/2834 709/250 |
| 2012/0331127 A1* | 12/2012 | Wang | G06F 9/5083 709/224 |
| 2013/0100821 A1* | 4/2013 | Joshi | H04W 48/20 370/241 |
| 2013/0303128 A1 | 11/2013 | Wang et al. | |

FOREIGN PATENT DOCUMENTS

| | | |
|---|---|---|
| CN | 101217484 A | 7/2008 |
| CN | 101662812 | 3/2010 |
| CN | 102014176 | 4/2011 |
| EP | 2007153 A1 | 12/2008 |
| TW | 201236387 | 9/2012 |

OTHER PUBLICATIONS

International Search Report, dated May 2, 2013, in corresponding International Application No. PCT/CN2013/070920 (6 pages).
Chinese Office Action dated Sep. 9, 2016 in corresponding Chinese Patent Application No. 201210184757.1 (6 pages).
Chinese Office Action dated Sep. 25, 2015 in corresponding Chinese Patent Application No. 201210184757.1.

* cited by examiner

TERMINAL REGISTRATION METHOD, DEVICE, AND SYSTEM

CROSS-REFERENCE TO RELATED APPLICATION

This application is a continuation of International Application No. PCT/CN2013/070920, filed on Jan. 24, 2013, which claims priority to Chinese Patent Application No. 201210184757.1, filed on Jun. 6, 2012, both of which are hereby incorporated by reference in their entireties.

TECHNICAL FIELD

The present invention relates to the field of wireless communications technologies, and in particular, to a terminal registration method, device, and system.

BACKGROUND

A cognitive radio technology is a most promising technology that solves a current problem of frequency spectrum resource scarcity. Unoccupied available frequency bands may be found mainly by perceiving a wireless frequency spectrum environment, and these frequency bands are dynamically accessed on the premise of not disturbing master subscribers.

To implement identification of a current radio environment, each regulation organization, such as Federal Communications Commission in America, Confederation of European Posts and Telecommunications, or Office of Communications in Britain, sets up a database. For the digital television field, the database stores use information of all television frequency spectrums, including a location of a television tower, a used frequency band, a coverage range, and so on, and a cognitive device may acquire a frequency spectrum condition of a current location by querying the database, thereby using a frequency spectrum that is not used by the digital television.

At present, each regulation organization hopes to push the standardization of the cognitive radio technology for television white frequency spectrums. Therefore, a cognitive device can use a white frequency spectrum resource to implement normal communication only after registering in the database, where the cognitive device may be a terminal. In a conventional registration process, a terminal can determine that registration is successful only after receiving a registration response message sent by the database. If the database does not return a registration response message for a long time, the terminal retains a connection to a network but cannot perform normal communication, which occupies a large number of network resources.

SUMMARY

Embodiments of the present invention provide a terminal registration method, device, and system, so as to ensure that a terminal timely determines whether registration is successful, thereby saving network resources.

To achieve the foregoing objectives, the following technical solutions are used in the embodiments of the present invention.

A terminal registration method is provided, including:
starting, by an access point device, monitoring on a monitored resource when the access point device receives an access request message sent by a terminal; and
after the terminal sends a registration request message to a database, if the access point device receives, when the monitored resource monitored by the access point device does not reach a monitoring threshold, a registration response message sent by the database, stopping the monitoring on the monitored resource, where the monitoring threshold is a preset threshold for the monitored resource.

Another terminal registration method is provided, including:
starting, by an access point device, monitoring on a monitored resource when the access point device receives an access request message sent by a terminal; and
after the terminal sends a registration request message to a database, if the access point device does not receive, when the monitored resource monitored by the access point device reaches or exceeds a monitoring threshold, a registration response message sent by the database, initiating a detaching process.

An access point device is provided, including:
a first starting unit, configured to start a monitoring unit for the access point device when the access point device receives an access request message sent by a terminal;
a first monitoring unit, configured to monitor a monitored resource, where there is a monitoring threshold recorded, and the monitoring threshold is a preset threshold for the monitored resource; and
a stopping unit, configured to: after the terminal sends a registration request message to a database, if the access point device receives, when the monitored resource monitored by the first monitoring unit does not reach the monitoring threshold, a registration response message sent by the database, stop the monitoring on the monitored resource.

Another access point device is provided, including:
a second starting unit, configured to start a monitoring unit for the access point device when the access point device receives an access request message sent by a terminal;
a second monitoring unit, configured to monitor a monitored resource, where there is a monitoring threshold recorded, and the monitoring threshold is a preset threshold for the monitored resource; and
a second detaching unit, configured to: after the terminal sends a registration request message to a database, if the access point device still does not receive, when the monitored resource monitored by the second monitoring unit reaches or exceeds the monitoring threshold, a registration response message sent by the database, initiate a detaching process.

A terminal registration system is provided, including: a terminal, an access point device, and a database, where
the terminal is configured to send an access request message to the access point device, and send a registration request message to the database;
the access point device is the access point device described above; and
the database is configured to receive the registration request message sent by the terminal, and send a registration response message to the access point device.

Another terminal registration system is provided, including a terminal, an access point device, and a database, where
the terminal is configured to send an access request message to the access point device, and send a registration request message to the database;
the access point device is the another access point device described above; and
the database is configured to receive the registration request message sent by the terminal, and send a registration response message to the access point device.

According to the terminal registration method, device, and system provided in the embodiments of the present invention, monitoring, for example, monitoring on time or transmitted data traffic, is performed during a terminal registration process, so that whether the terminal is successfully registered at the time or when the traffic reaches or exceeds a monitoring threshold is determined in time, thereby saving network resources.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
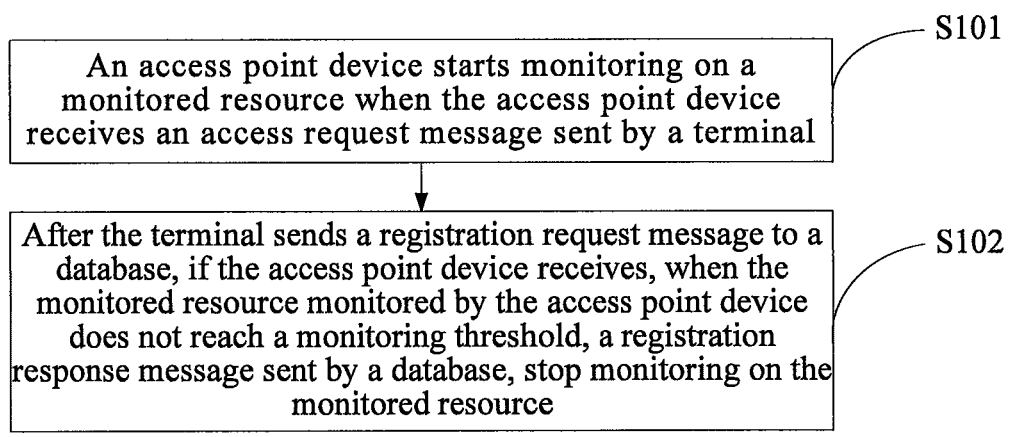
FIG. 1 is a schematic diagram of a terminal registration method according to an embodiment of the present invention.

An embodiment of the present invention provides a terminal registration method. As shown in FIG. 1, this embodiment of the present invention is performed by an access point device, and the access point device is a base station on an LTE (Long Term Evolution, Long Term Evolution) network, and is an AP (Wireless Access Point, Wireless Access Point) on a WIFI network. The method includes:

S101. The access point device starts monitoring on a monitored resource when the access point device receives an access request message sent by a terminal.

Specifically, when initiating a connection to a network, the terminal first needs to send the access request message to the access point device, so that the access point device starts the monitoring on the monitored resource.

The monitored resource may be time or transmitted data traffic, but this embodiment of the present invention is not limited thereto.

S102. After the terminal sends a registration request message to a database, if the access point device receives, when the monitored resource monitored by the access point device does not reach a monitoring threshold, a registration response message sent by the database, stop the monitoring on the monitored resource.

The monitoring threshold is a preset threshold for the monitored resource. If the monitored resource is a time resource, the monitoring threshold is a time threshold, and specifically, the time may be monitored by setting a timer in the access point device, and the time threshold is recorded in the timer; and if the monitored resource is transmitted data traffic, the monitoring threshold is a traffic threshold, and specifically, the traffic may be monitored by setting a traffic monitor, and the traffic threshold is recorded in the traffic monitor.

Further, after the terminal sends the registration request message to the database, if the access point device does not receive the registration response message when the monitored resource monitored by the access point device reaches or exceeds the monitoring threshold, a detaching process is initiated.

Initiating the detaching process indicates that the terminal fails to be registered, so that a connection to a current network is disconnected. The detaching process is specifically that: the access point device sends a detach request message to the terminal or a network device, where if the access point device sends the detach request message to the terminal, the terminal sends a detach message to the network device by using the access point device, so as to disconnect the connection between the terminal and the current network; and if the access point device sends the detach request message to the network device, the network device sends a detach message to the terminal by using the access point device, so as to disconnect the connection between the terminal and the current network.

If the network is an LTE network, the network device is an MME (Mobility Management Entity, mobility management entity) or an HSS (Home Subscriber Server, home subscriber server). If the network is a WIFI network, the network device is an HSS.

It should be noted that, a registration procedure in the foregoing embodiment is performed in an original registration procedure; therefore, the registration process is also reliable and secure.

According to the terminal registration method provided in the foregoing embodiment, monitoring, for example, monitoring on time or transmitted data traffic, is performed during a terminal registration process, so that whether a terminal is successfully registered at the time or when the traffic reaches or exceeds a monitoring threshold is determined in time, thereby saving network resources.

Figure 2:
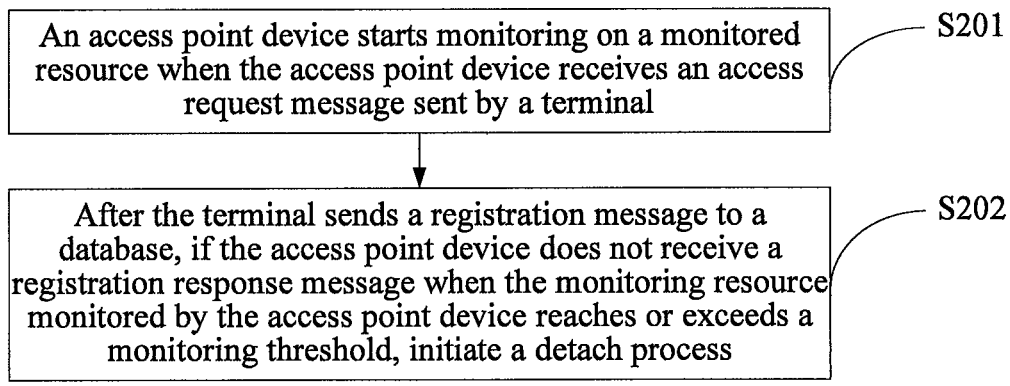
FIG. 2 is a schematic flowchart of a terminal registration method according to an embodiment of the present invention.

An embodiment of the present invention provides a terminal registration method. As shown in FIG. 2, this method embodiment is performed by an access point device. The method includes:

S201. The access point device starts monitoring on a monitored resource when the access point device receives an access request message sent by a terminal.

Specifically, when initiating a connection to a network, the terminal first needs to send the access request message to the access point device, so that the access point device starts the monitoring on the monitored resource.

The monitored resource may be time or transmitted data traffic, but this embodiment of the present invention is not limited thereto.

S202. After the terminal sends a registration request message to a database, if the access point device does not receive, when the monitored resource monitored by the access point device reaches or exceeds a monitoring threshold, a registration response message sent by the database, initiate a detaching process.

The monitoring threshold is a preset threshold for the monitored resource. If the monitored resource is a time resource, the monitoring threshold is a time threshold, and specifically, the time may be monitored by setting a timer in the access point device, and the time threshold is recorded in the timer; and if the monitored resource is transmitted data traffic, the monitoring threshold is a traffic threshold, and specifically, the traffic may be monitored by setting a traffic monitor, and the traffic threshold is recorded in the traffic monitor.

The foregoing initiating the detaching process indicates that the terminal fails to be registered, so that a connection to a current network is disconnected. The detaching process is specifically that: a base station sends a detach request message to the terminal or a network device, where if the base station sends the detach request message to the terminal, the terminal sends a detach message to the network device by using the access point device, so as to disconnect the connection between the terminal and the current network; and if the base station sends the detach request message to the network device, the network device sends a detach message to the terminal by using the access point device, so as to disconnect the connection between the terminal and the current network.

In addition, if the network is an LTE network, the network device is an MME or an HSS; and if the network is a WIFI network, the network device is an HSS.

It should be noted that, a registration procedure in the foregoing embodiment is performed in an original registration procedure; therefore, the registration process is also reliable and secure.

According to the terminal registration method provided in the foregoing embodiment, monitoring, for example, monitoring on time or transmitted data traffic, is performed during a terminal registration process, so that whether a terminal is successfully registered at the time or when the traffic reaches or exceeds a monitoring threshold is determined in time, thereby saving network resources.

Figure 3:
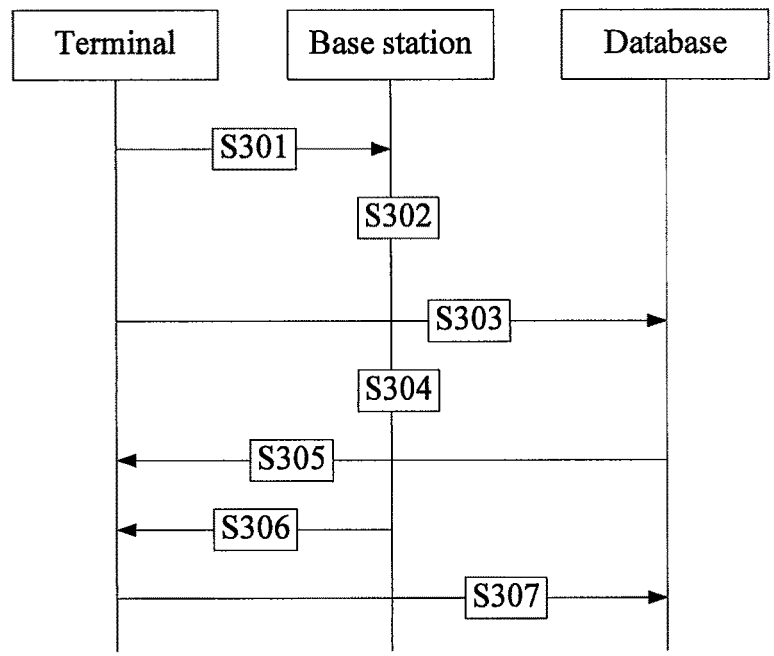
FIG. 3 is a schematic flowchart of another terminal registration method according to an embodiment of the present invention.

An embodiment of the present invention provides a terminal registration method. As shown in FIG. 3, this method embodiment is described in a scenario of an LTE network by using an example in which a monitored resource is a time resource, a monitoring threshold is a time threshold, and an access point device is a base station. Specific steps of this method embodiment include:

S301. A terminal sends an access request message to the base station, so as to request access to a network.

S302. The base station starts monitoring on the time by using a timer when the terminal sends the access request message to the base station.

The timer is set in the base station, and a preset time threshold is recorded in the timer.

S303. The terminal sends a registration request message to a database by using the base station.

If the base station receives, when the time monitored by the base station does not reach the time threshold, a registration response message sent by the database, step S304 to step S305 are performed.

If the base station does not receive the registration response message when the time monitored by the base station reaches or exceeds the time threshold, step S306 to step S307 are performed.

S304. The base station stops the monitoring on the time by using the timer.

S305. The terminal determines that the terminal is successfully registered after receiving a registration confirmation message sent by the database.

It should be noted that, the foregoing registration response message and the registration confirmation message may be encapsulated into a same data packet to be sent to the terminal by using the base station.

S306. The base station sends a detach request message to the terminal.

S307. The terminal sends a detach message to a network device by using the base station, so as to disconnect a connection between the terminal and a current network.

The network device may be an MME or an HSS.

In addition, in step S306, the base station may further send the detach request message to the network device, and then step S307 is that: the network device sends a detach message to the terminal, so as to disconnect the connection between the terminal and the current network.

It should be noted that, the monitored resource in the foregoing embodiment is described by using the time as an example, but this embodiment of the present invention is not limited thereto. The monitored resource may also be transmitted data traffic. For a specific registration procedure for traffic monitoring, refer to the foregoing steps, and no detail is repeatedly described herein.

In addition, a registration procedure in the foregoing embodiment is performed in an original registration procedure; therefore, the registration process is also reliable and secure.

According to the terminal registration method provided in the foregoing embodiment, monitoring, for example, monitoring on time or transmitted data traffic, is performed during a terminal registration process, so that whether a terminal is successfully registered at the time or when the traffic reaches or exceeds a monitoring threshold is determined in time, thereby saving network resources.

Figure 4:
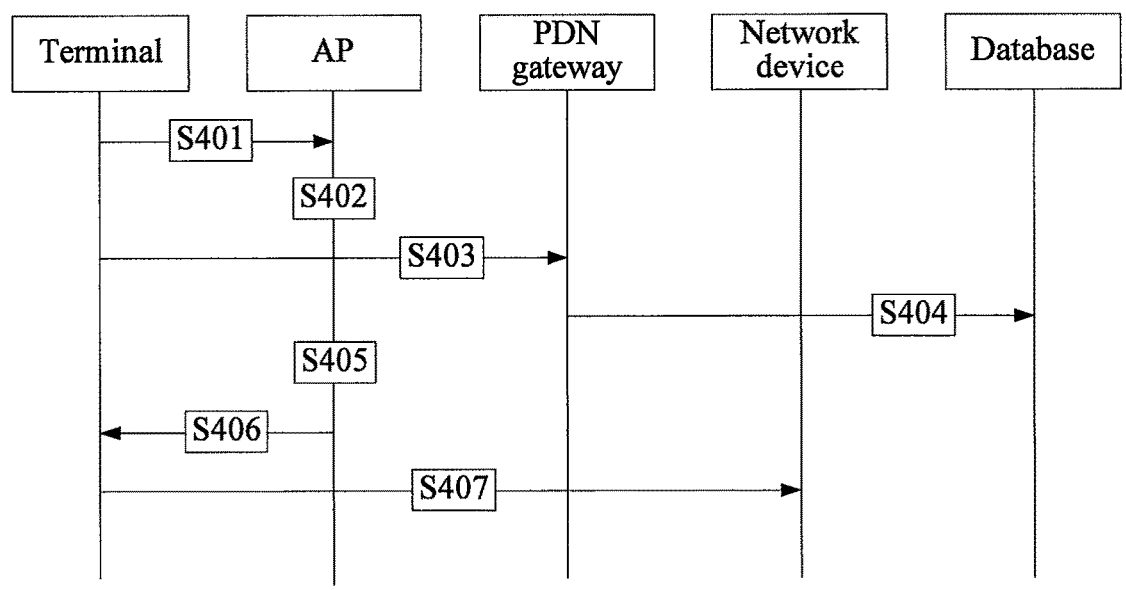
FIG. 4 is a schematic flowchart of another terminal registration method according to an embodiment of the present invention.

An embodiment of the present invention provides a terminal registration method. As shown in FIG. 4, this method embodiment is described in a scenario of a trusty WIFI network by using an example in which a monitored resource is a time resource, a monitoring threshold is a time threshold, and an access point device is an AP. Specific steps of this method embodiment include:

S401. A terminal sends an access request message to the AP, so as to request access to a network.

S402. The AP starts monitoring on the time by using a timer when the terminal sends the access request message to the AP.

The timer is set in the AP, and a preset time threshold is recorded in the timer.

S403. The terminal sends a registration request message to a PDN (Public Data Network, public data network) gateway by using the AP.

S404. The PDN gateway sends the registration request message to a database.

If the AP receives, when the time monitored by the AP does not reach the time threshold, a registration response message sent by the database, step S405 is performed.

If the AP does not receive the registration response message when the time monitored by the AP reaches or exceeds the time threshold, step S406 to step S407 are performed.

S405. The AP stops the monitoring on the time by using the timer.

S406. The AP sends a detach request message to the terminal.

S407. The terminal sends a detach message to a network device by using the AP, so as to disconnect a connection between the terminal and a current network.

The network device may be an HSS.

In addition, in step S406, the AP may also send the detach request message to the network device, and then step S407 is that: the network device sends a detach message to the terminal, so as to disconnect the connection between the terminal and the current network.

It should be noted that, the monitored resource in the foregoing embodiment is described by using the time as an example, but this embodiment of the present invention is not limited thereto. The monitored resource may also be transmitted data traffic. For a specific registration procedure for traffic monitoring, refer to the foregoing steps, and no detail is repeatedly described herein.

In addition, a registration procedure in the foregoing embodiment is performed in an original registration procedure; therefore, the registration process is also reliable and secure.

According to the terminal registration method provided in the foregoing embodiment, monitoring, for example, monitoring on time or transmitted data traffic, is performed during a terminal registration process, so that whether a terminal is successfully registered at the time or when the traffic reaches or exceeds a monitoring threshold is determined in time, thereby saving network resources.

Figure 5:
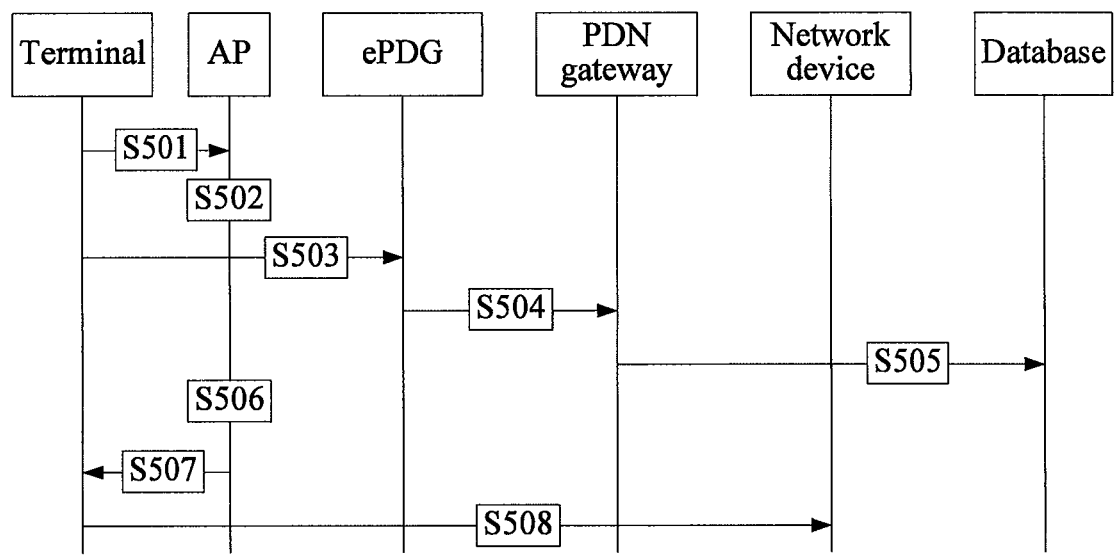
FIG. 5 is a schematic flowchart of another terminal registration method according to an embodiment of the present invention.

An embodiment of the present invention provides a terminal registration method. As shown in FIG. 5, this method embodiment is described in a scenario of an untrusted WIFI network by using an example in which a monitored resource is a time resource, a monitoring threshold is a time threshold, and an access point device is an AP. Specific steps of this method embodiment include:

S501. A terminal sends an access request message to the AP, so as to request access to a network.

S502. The AP starts monitoring on the time by using a timer when the terminal sends the access request message to the AP.

The timer is set in the AP, and a preset time threshold is recorded in the timer.

S503. The terminal sends a registration request message to an ePDG (evolved Packet Data Gateway, evolved packet data gateway) by using the AP.

The ePDG is used for access to an untrusted network, is connected to a PDN gateway by using an interface to route a data packet between the terminal and the PDN gateway, and completes transmission tunnel authentication and registration as a mobile access gateway.

S504. The ePDG sends the registration request message to a PDN (Public Data Network, public data network) gateway.

S505. The PDN gateway sends the registration request message to a database.

If the AP receives, when the time monitored by the AP does not reach the time threshold, a registration response message sent by the database, step S506 is performed.

If the AP does not receive the registration response message when the time monitored by the AP reaches or exceeds the time threshold, step S507 to step S508 are performed.

S506. The AP stops the monitoring on the time by using the timer.

S507. The AP sends a detach request message to the terminal.

S508. The terminal sends a detach message to a network device by using the AP, so as to disconnect a connection between the terminal and a current network.

The network device may be an HSS.

In addition, in step S507, the AP may also send the detach request message to the network device, and then the step S508 is that: the network device sends a detach message to the terminal, so as to disconnect the connection between the terminal and the current network.

It should be noted that, the monitored resource in the foregoing embodiment is described by using the time as an example, but this embodiment of the present invention is not limited thereto. The monitored resource may also be transmitted data traffic. For a specific registration procedure for traffic monitoring, refer to the foregoing steps, and no detail is repeatedly described herein.

In addition, a registration procedure in the foregoing embodiment is performed in an original registration procedure; therefore, the registration process is also reliable and secure.

According to the terminal registration method provided in the foregoing embodiment, monitoring, for example, monitoring on time or transmitted data traffic, is performed during a terminal registration process, so that whether a terminal is successfully registered at the time or when the traffic reaches or exceeds a monitoring threshold is determined in time, thereby saving network resources.

It should be noted that, for the foregoing method embodiments, for ease of description, the method embodiments are described as a series of action combinations. However, a person skilled in the art should know that the present invention is not limited by the descried action sequence; secondly, a person skilled in the art should also know that all the embodiments described in this specification are exemplary embodiments, and the actions and modules involved are not necessarily mandatory in the present invention.

Figure 6:
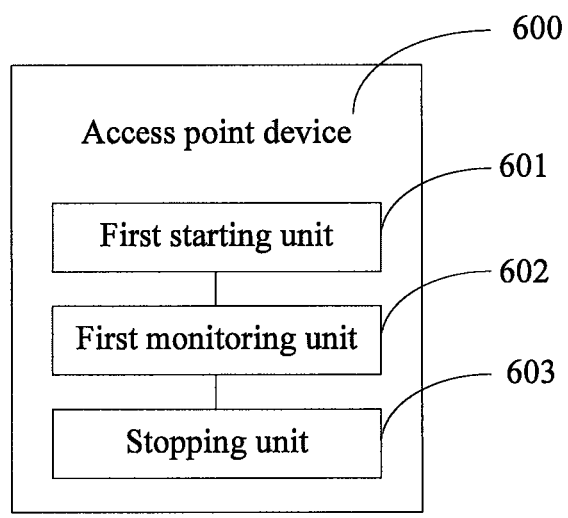
FIG. 6 is a schematic structural diagram of an access point device according to an embodiment of the present invention.

An embodiment of the present invention provides an access point device 600, as shown in FIG. 6, including:

a first starting unit 601, configured to start a first monitoring unit 602 for the access point device when the access point device receives an access request message sent by a terminal;

a first monitoring unit 602, configured to monitor a monitored resource, where there is a monitoring threshold recorded, and the monitoring threshold is a preset threshold for the monitored resource, where the monitoring threshold is the preset threshold for the monitored resource, and if the monitored resource is a time resource, the monitoring threshold is a time threshold, and if the monitored resource is transmitted data traffic, the monitoring threshold is a traffic threshold; and a stopping unit 603, configured to: after the terminal sends a registration request message to a database, if the access point device receives, when the monitored resource monitored by the first monitoring unit 602 does not reach the monitoring threshold, a registration response message sent by the database, stop the monitoring on the monitored resource.

Figure 7:
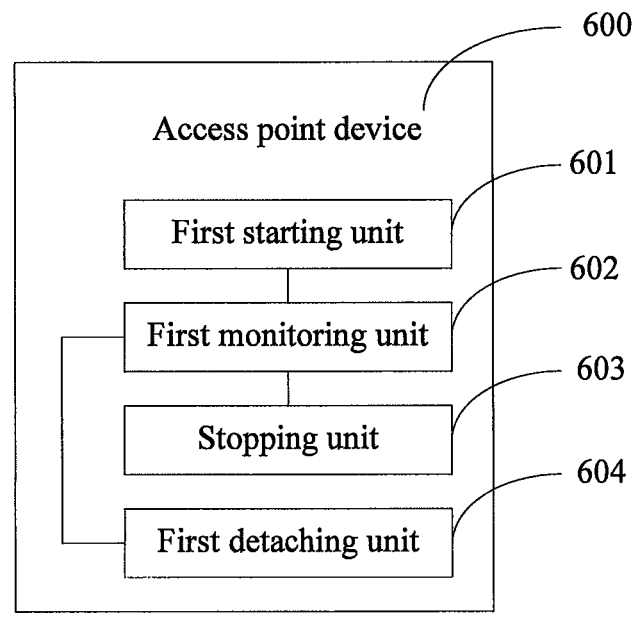
FIG. 7 is a schematic structural diagram of another access point device according to an embodiment of the present invention.

Further, as shown in FIG. 7, the access point device 600 further includes: a first detaching unit 604, configured to: after the terminal sends the registration request message to the database, if the access point device does not receive, when the monitored resource monitored by the first monitoring unit 602 reaches or exceeds the monitoring threshold, the registration response message sent by the database, initiate a detaching process.

For the detaching process in this embodiment, reference may be made to the description of the detaching process in the foregoing embodiments.

It should be noted that, the foregoing access point device is a base station on an LTE network and is an AP on a WIFI network; and the first monitoring unit in the foregoing access point device may be a timer or a traffic monitor.

According to the access point device provided in the foregoing embodiment, monitoring, for example, monitoring on time or transmitted data traffic, is performed during a terminal registration process, so that whether a terminal is successfully registered at the time or when the traffic reaches or exceeds a monitoring threshold is determined in time, thereby saving network resources.

Figure 8:
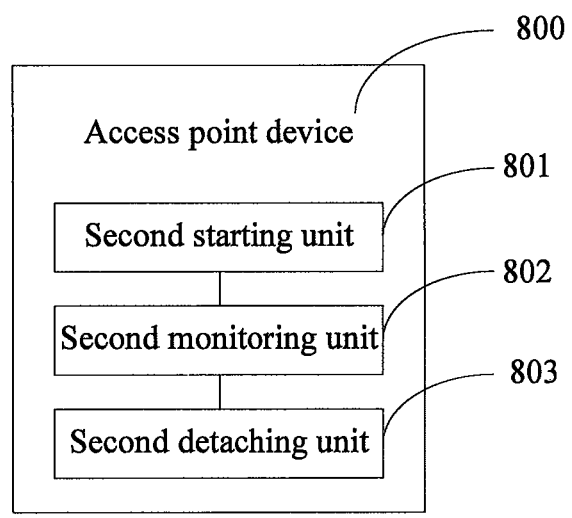
FIG. 8 is a schematic structural diagram of another access point device according to an embodiment of the present invention.

An embodiment of the present invention provides an access point device 800, as shown in FIG. 8, including:

a second starting unit 801, configured to start a second monitoring unit 802 for the access point device when the access point device receives an access request message sent by a terminal;

a second monitoring unit 802, configured to monitor a monitored resource, where there is a monitoring threshold recorded, and the monitoring threshold is a preset threshold for the monitored resource, where the monitoring threshold is the preset threshold for the monitored resource, and if the monitored resource is a time resource, the monitoring threshold is a time threshold, and if the monitored resource is transmitted data traffic, the monitoring threshold is a traffic threshold; and a second detaching unit 803, configured to: after the terminal sends a registration request message to a database, if the access point device does not receive, when the monitored resource monitored by the second monitoring unit 802 reaches or exceeds the monitoring threshold, a registration response message sent by the database, initiate a detaching process.

For the detaching process in this embodiment, reference may be made to the description of the detaching process in the foregoing embodiments.

It should be noted that, the foregoing access point device is a base station on an LTE network and is an AP on a WIFI network; and the second monitoring unit in the foregoing access point device may be a timer or a traffic monitor.

According to the access point device provided in the foregoing embodiment, monitoring, for example, monitoring on time or transmitted data traffic, is performed during a terminal registration process, so that whether a terminal is successfully registered at the time or when the traffic reaches or exceeds a monitoring threshold is determined in time, thereby saving network resources.

A person skilled in the art can clearly understand that, for convenient and brief description, for detailed working processes of the devices described above, reference may be made to corresponding processes in the foregoing method embodiments, and no detail is repeatedly described herein.

Figure 9:
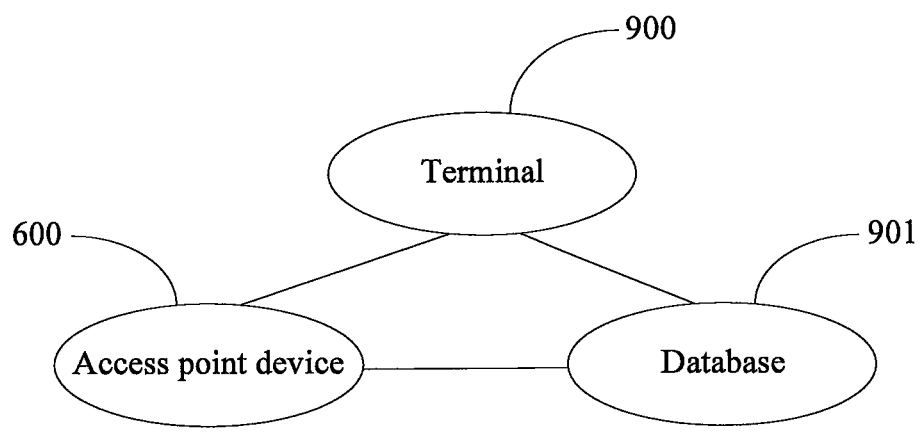
FIG. 9 is a terminal registration system according to an embodiment of the present invention.

An embodiment of the present invention provides a terminal registration system, as shown in FIG. 9, including: a terminal 900, an access point device 600, and a database 901, where the terminal 900 is configured to send an access request message to the access point device, and send a registration request message to the database 901;

the access point device is the access point device 600 shown in the FIG. 6 or FIG. 7; and the database 901 is configured to receive the registration request message sent by the terminal 900, and send a registration response message to the access point device 600.

It should be noted that, the access point device described in the foregoing FIG. 6 or FIG. 7 is applied to the foregoing terminal registration method, and units of the device correspond to steps of the method.

According to the terminal registration system provided in the foregoing embodiment, an access point device performs monitoring, for example, monitoring on time or transmitted data traffic, during a terminal registration process, so that whether a terminal is successfully registered at the time or when the traffic reaches or exceeds a monitoring threshold is determined in time, thereby saving network resources.

Figure 10:
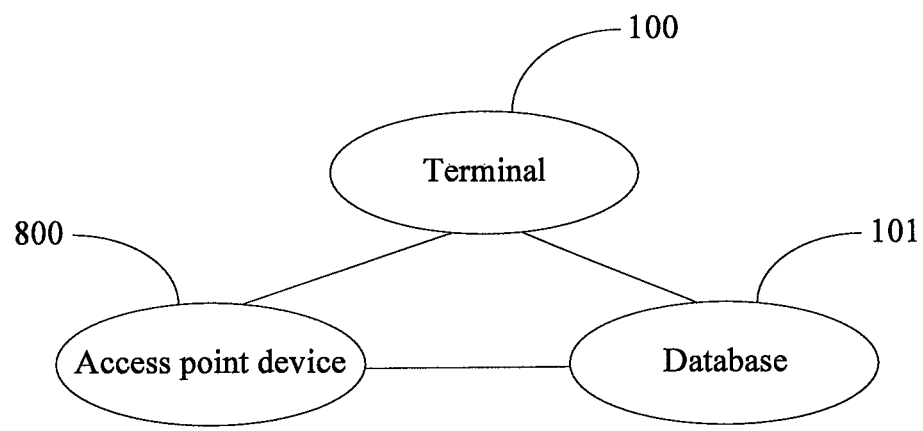
FIG. 10 is a terminal registration system according to an embodiment of the present invention.

An embodiment of the present invention provides a terminal registration system, as shown in FIG. 10, including: a terminal 100, an access point device 800, and a database 101, where the terminal 100 is configured to send an access request message to the access point device, and send a registration request message to the database;

the access point device 800 is the access point device shown in the FIG. 8; and the database 101 is configured to receive the registration request message sent by the terminal, and send a registration response message to the access point device 800.

It should be noted that, the access point device described in the foregoing FIG. 8 is applied to the foregoing terminal registration method, and units of the device correspond to steps of the method.

According to the terminal registration system provided in the foregoing embodiment, an access point device performs monitoring, for example, monitoring on time or transmitted data traffic, during a terminal registration process, so that whether a terminal is successfully registered at the time or when the traffic reaches or exceeds a monitoring threshold is determined in time, thereby saving network resources.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A terminal registration method, comprising:
   starting, by an access point device, monitoring of a monitored resource when the access point device receives an access request message sent by a terminal; and
   stopping the monitoring of the monitored resource after the terminal sends a registration request message to a database if the access point device receives a registration response message sent by the database when the monitored resource monitored by the access point device does not reach a monitoring threshold, wherein the monitoring threshold is a preset threshold for the monitored resource.

2. The method according to claim 1, wherein the method further comprises:
   initiating a detaching process after the terminal sends the registration request message to the database if the access point device does not receive the registration response message when the monitored resource monitored by the access point device reaches or exceeds the monitoring threshold.

3. The method according to claim 1, wherein the monitored resource is a time resource, and the monitoring threshold is a time threshold.

4. The method according to claim 1, wherein the monitored resource is transmitted data traffic, and the monitoring threshold is a traffic threshold.

5. A terminal registration method, comprising:
   starting, by an access point device, monitoring of a monitored resource when the access point device receives an access request message sent by a terminal; and
   initiating a detaching process after the terminal sends a registration request message to a database if the access point device does not receive a registration response message sent by the database when the monitored resource monitored by the access point device reaches or exceeds a monitoring threshold.

6. The method according to claim 5, wherein the monitored resource is a time resource, and the monitoring threshold is a time threshold; or
   the monitored resource is transmitted data traffic, and the monitoring threshold is a traffic threshold.

7. An access point device, comprising:
   a memory storing instructions; and
   a processor coupled to the memory and configured to:
   start to monitor a monitored resource when the access point device receives an access request message sent by a terminal; and
   stop the monitoring of the monitored resource after the terminal sends a registration request message to a database if the access point device receives a registration response message sent by the database when the monitored resource monitored by the access point device does not reach a monitoring threshold, wherein the monitoring threshold is a preset threshold for the monitored resource.

8. The access point device according to claim 7, wherein the processor is further configured to:
   initiate a detaching process after the terminal sends the registration request message to the database if the access point device does not receive the registration response message when the monitored resource monitored by the access point device reaches or exceeds the monitoring threshold.

9. The device according to claim 7, wherein the monitored resource is a time resource, and the monitoring threshold is a time threshold.

10. The device according to claim 7, wherein the monitored resource is transmitted data traffic, and the monitoring threshold is a traffic threshold.

11. An access point device, comprising:
    a memory storing instructions; and
    a processor coupled to the memory and configured to:
    start to monitor a monitored resource when the access point device receives an access request message sent by a terminal; and
    initiate a detaching process after the terminal sends a registration request message to a database if the access point device does not receive a registration response message sent by the database when the monitored resource monitored by the access point device reaches or exceeds a monitoring threshold.

12. The device according to claim 11, wherein the monitored resource is a time resource, and the monitoring threshold is a time threshold.

13. The device according to claim 11, wherein the monitored resource is transmitted data traffic, and the monitoring threshold is a traffic threshold.

* * * * *